US009815400B2

(12) United States Patent
Nishii et al.

(10) Patent No.: US 9,815,400 B2
(45) Date of Patent: Nov. 14, 2017

(54) HEADLIGHT CONTROL DEVICE AND HEADLIGHT

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Takahito Nishii, Kariya (JP); Naohito Kato, Kariya (JP); Koichi Kato, Kariya (JP); Kazuya Asaoka, Seto (JP); Sho Masuda, Toyota (JP)

(73) Assignees: DENSO CORPORATION, Kariya (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/103,960

(22) PCT Filed: Jan. 26, 2015

(86) PCT No.: PCT/JP2015/000323
§ 371 (c)(1),
(2) Date: Jun. 13, 2016

(87) PCT Pub. No.: WO2015/115083
PCT Pub. Date: Aug. 6, 2015

(65) Prior Publication Data
US 2016/0368413 A1 Dec. 22, 2016

(30) Foreign Application Priority Data
Jan. 31, 2014 (JP) ................................. 2014-016914

(51) Int. Cl.
B60Q 1/14 (2006.01)
B60Q 1/08 (2006.01)
(Continued)

(52) U.S. Cl.
CPC ............ *B60Q 1/143* (2013.01); *B60Q 1/085* (2013.01); *F21S 48/1388* (2013.01);
(Continued)

(58) Field of Classification Search
CPC .. B60Q 1/14; B60Q 2300/42; B60Q 2300/45; B60Q 2300/112; B60Q 2300/314
(Continued)

(56) References Cited

U.S. PATENT DOCUMENTS 8,017,898 B2 * 9/2011 Lu .................... B60Q 1/1423
250/208.1
2005/0004762 A1 * 1/2005 Takahama ............ G01S 17/936
701/301
(Continued)

FOREIGN PATENT DOCUMENTS

EP 2233356 A1 9/2010
EP 2 631 122 A1 8/2013
(Continued)

*Primary Examiner* — Tung X Le
(74) *Attorney, Agent, or Firm* — Posz Law Group, PLC

(57) ABSTRACT

A headlight control device provided in a vehicle to perform headlight control and to control a distribution of light irradiated from a light source is provided. The headlight control device includes: a determination unit that determines a presence and an absence of an obstacle in front of the vehicle and determines a position of the obstacle; a setting unit that sets up an area covering the obstacle as an intensified illumination area when the determination unit determines the presence of the obstacle, wherein the intensified illumination area is an area to which the light from the light source is irradiated in a manner different than a peripheral area of the intensified illumination area; and a controller that controls the distribution of the light irradiated from the light
(Continued)

source so that the intensified illumination area set up by the setting unit has an illuminated zone and a non-illuminated zone.

15 Claims, 8 Drawing Sheets

(51) Int. Cl.
  *F21S 8/10* (2006.01)
  *H05B 37/02* (2006.01)
  *F21Y 115/10* (2016.01)

(52) U.S. Cl.
  CPC ..... *H05B 37/0227* (2013.01); *B60Q 2200/00* (2013.01); *B60Q 2300/054* (2013.01); *B60Q 2300/45* (2013.01); *B60Q 2900/00* (2013.01); *F21Y 2115/10* (2016.08)

(58) Field of Classification Search
  USPC ...................................... 315/77, 82
  See application file for complete search history.

(56) References Cited

U.S. PATENT DOCUMENTS

| | | | |
|---|---|---|---|
| 2009/0045323 A1* | 2/2009 | Lu | B60Q 1/1423 250/208.1 |
| 2013/0058116 A1 | 3/2013 | Galbas et al. | |
| 2014/0003070 A1 | 1/2014 | Nakaya | |

FOREIGN PATENT DOCUMENTS

| | | |
|---|---|---|
| JP | 2013-184614 A | 9/2013 |
| JP | 2013-199263 A | 10/2013 |
| JP | 2014-061747 A | 4/2014 |
| JP | 2014-184851 A | 10/2014 |

\* cited by examiner

TIMING t1

TIMING t2

TIMING t11

TIMING t12

TIMING t13

HEADLIGHT CONTROL DEVICE AND HEADLIGHT

CROSS REFERENCE TO RELATED APPLICATIONS

This application is a U.S. national stage of International Application No. PCT/JP2015/000323 filed on Jan. 26, 2015 and is based on Japanese Patent Application No. 2014-16914 filed on Jan. 31, 2014, the disclosures of which are incorporated herein by reference.

TECHNICAL FIELD

The present disclosure relates to a headlight control device and a headlight.

BACKGROUND ART

An example of conventional headlight control devices, there is a multilight-type headlight disclosed in Patent Literature 1. This multilight-type headlight aims at suppressing the dazzle of a pedestrian and, at the same time, aims at enabling a driver to make the visual confirmation of a pedestrian satisfactorily. The multilight-type headlight includes a pedestrian light specifying unit and an illumination amount controller. Based on position information of a pedestrian acquired from a pedestrian detection sensor, the pedestrian light specifying unit specifies the light to illuminate the pedestrian. The illumination amount controller reduces the illumination amount to the upper half of the body of the pedestrian irradiated by the light specified by the pedestrian light specifying unit, as the distance to the pedestrian acquired from the pedestrian detection sensor becomes smaller. The multilight-type headlight flashes a pedestrian photographing area, when there is a possibility that distance may approach within a threshold.

PRIOR ART LITERATURES

Patent Literature

Patent Literature 1: JP-2013-184614A

SUMMARY OF INVENTION

The inventors of the present application have found out the following issues regarding the headlight control device and the headlight. The above-described multilight-type headlight flashes a pedestrian by use of a spotlight, in order to notify a driver of the presence of the pedestrian at night. At this time, the multilight-type headlight changes periodically the angle of a pedestrian illumination mirror, from the inside of a pedestrian photographing area to the outside of the pedestrian photographing area and from the outside of the pedestrian photographing area to the inside of the pedestrian photographing area. The multilight-type headlight flashes the pedestrian by use of a spotlight in this way. However, when the angle of the pedestrian illumination mirror is changed to the outside of the pedestrian photographing area, no light is momentarily irradiated to the pedestrian. Furthermore, it can be considered that the object which the driver should confirm visually includes other obstacles than pedestrians, such as parking vehicles.

The present disclosure is made in view of the above and has an object to provide a headlight control device and a headlight that can irradiate the light to an obstacle so as to be easily confirmed visually by a driver and at the same time can suppress a situation of no light being momentarily irradiated to the obstacle.

In an example of the present disclosure, a headlight control device provided in a vehicle to perform headlight control and to control a distribution of light irradiated from a light source comprises: a determination unit that determines a presence and an absence of an obstacle in front of the vehicle and determines a position of the obstacle; a setting unit that sets up an area covering the obstacle as an intensified illumination area when the determination unit determines the presence of the obstacle, wherein the intensified illumination area is an area to which the light from the light source is irradiated in a manner different than a peripheral area of the intensified illumination area; and a controller that controls the distribution of the light irradiated from the light source so that the intensified illumination area set up by the setting unit has an illuminated zone and a non-illuminated zone.

According to such a headlight control device, it is possible to irradiate the light to an obstacle so as to be easily confirmed visually by a driver, by setting the area including the obstacle as the intensified illumination area to which the light from the light source is irradiated in a mode different from the peripheral area of the area. Furthermore, it is possible to suppress the situation of no light being momentarily irradiated to the obstacle, by controlling the distribution of the light irradiated from a light source so as to include an illuminated zone and a non-illuminated zone in this intensified illumination area.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

The following describes embodiments, referring to drawings. In each of the embodiments, the same reference symbol is attached to a portion corresponding to what has been explained in the preceding embodiment, and the duplicated explanation thereof may be omitted. When a part of the configuration is explained in each embodiment, other embodiments previously explained can be referred to and applied to other parts of the configuration.

Figure 1:
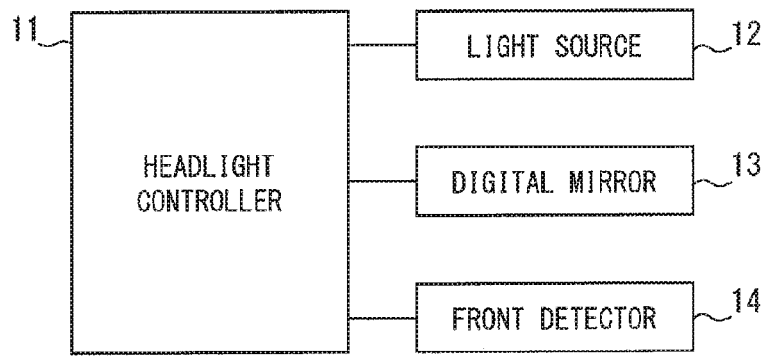
FIG. 1 is a block diagram illustrating an outline configuration of a headlight according to an embodiment.
Figure 2:
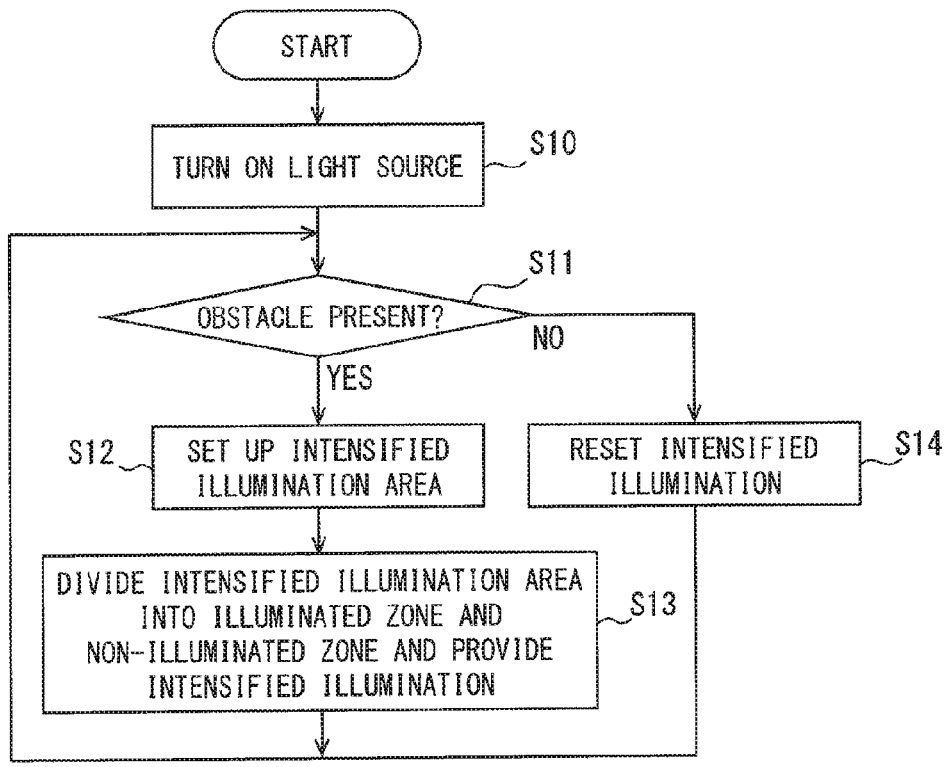
FIG. 2 is a flow chart illustrating a processing operation of the headlight control device according to the embodiment.

As illustrated in FIG. 1, a headlight 10 includes a headlight controller 11, a light source 12, a digital mirror 13, and a front detector 14. The headlight 10 is mounted to a front part of a vehicle and illuminates a forward direction of the vehicle when the vehicle runs at night or the like. The headlight 10 is also called a headlamp.

The headlight controller 11 corresponds to a headlight control device. The headlight controller 11 is an electronic control unit which includes a processing unit, a storage unit, and an input/output unit, for example. The headlight controller 11 controls the headlight 10 and controls a distribution of light irradiated from the light source 12. The headlight controller 11 is electrically coupled to the light source 12, the digital mirror 13, and the front detector 14. The headlight controller 11 acquires a detection result from the front detector and outputs a control signal to the light source 12 and the digital mirror 13. A processing operation of the headlight controller 11 will be explained in detail later.

The light source 12 is based on a well-known technology, and can employ a light emitting diode (hereinafter described as an LED), a halogen lamp, a metal halide lamp, etc. The light source 12 includes at least one light source for a high beam and at least one light source for a low beam. Compared with the low beam, the high beam is upward and is irradiated to a long distance. In other words, the high beam is horizontally irradiated, and is irradiated to a longer distance than the low beam. Therefore, the high beam can be rephrased as a travelling headlight. On the other hand, compared with the high beam, the low beam is downward and is irradiated to a near distance than the high beam. Therefore, the low beam can be rephrased as a crossing headlight. Note that the light source 12 is not limited to this. It suffices that the headlight 10 may include at least one light source 12.

Figure 4:
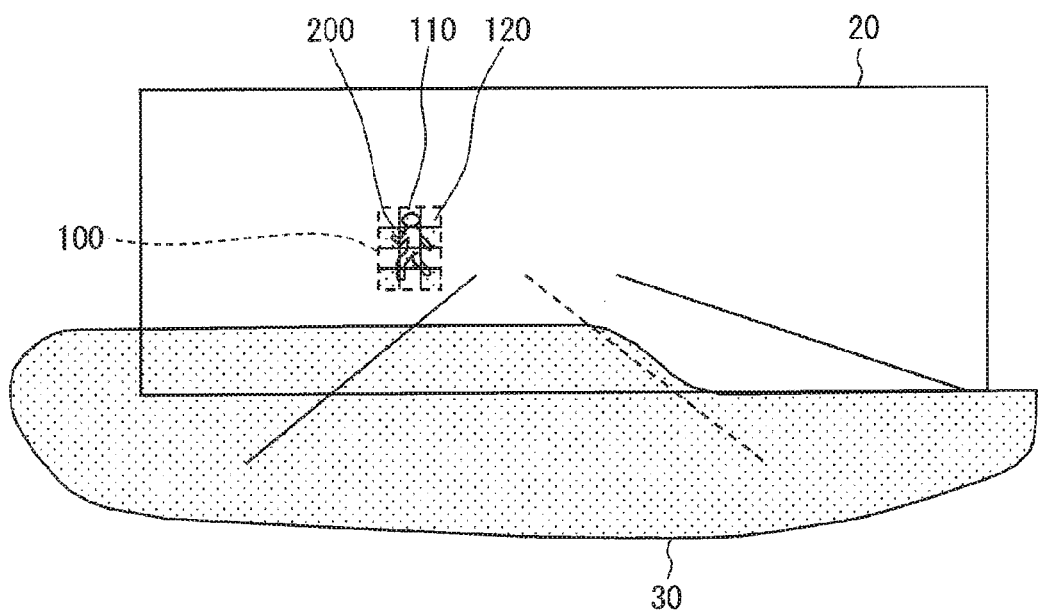
FIG. 4 is a conceptual drawing illustrating irradiating only with a low beam from the headlight according to the embodiment.
Figure 5:
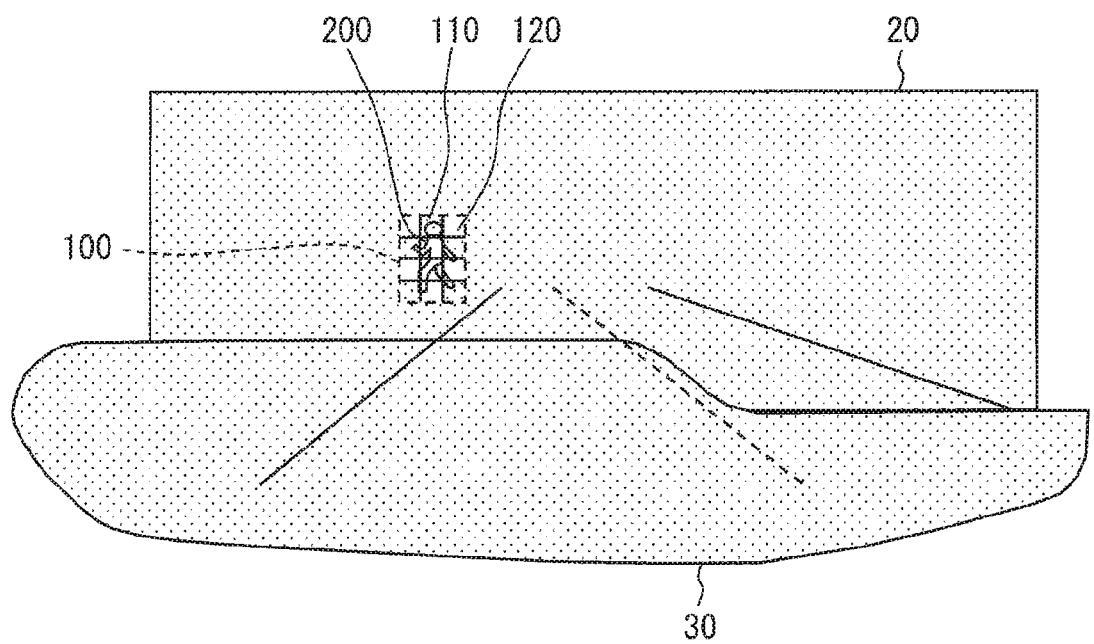
FIG. 5 is a conceptual drawing illustrating irradiating with both a low beam and a high beam from the headlight according to the embodiment.

FIG. 4 is a conceptual drawing illustrating the front of the vehicle when the light source 12 irradiates only the low beam. FIG. 5 is a conceptual drawing illustrating the front of the vehicle when the light source 12 irradiates the low beam and the high beam. The symbol 20 in FIGS. 4 and 5 illustrates a high beam area which the light source 12 can irradiate with the high beam, and the symbol 30 illustrates a low beam area which the light source 12 can irradiate with the low beam. Therefore, the available illumination area of the headlight 10 is given by the high beam area 20 and the low beam area 30.

In FIGS. 4 and 5, the area irradiated with the light from the light source 12 is hatched (although not a sectional view), in order to clarify the area irradiated with the light from the light source 12 and the area not irradiated. Furthermore, in the present embodiment, in other drawings such as FIG. 3 in addition to FIGS. 4 and 5, the area irradiated with the light from the light source 12 is hatched, The digital mirror 13 is an array of multiple mirrors 131. This digital mirror 13 can be called an MEMS mirror. The mirror 131 can be called a micro mirror. The MEMS stands for a Micro Electro Mechanical System. The mirror 131 can also be called a mirror element and a single mirror body.

Figure 3:
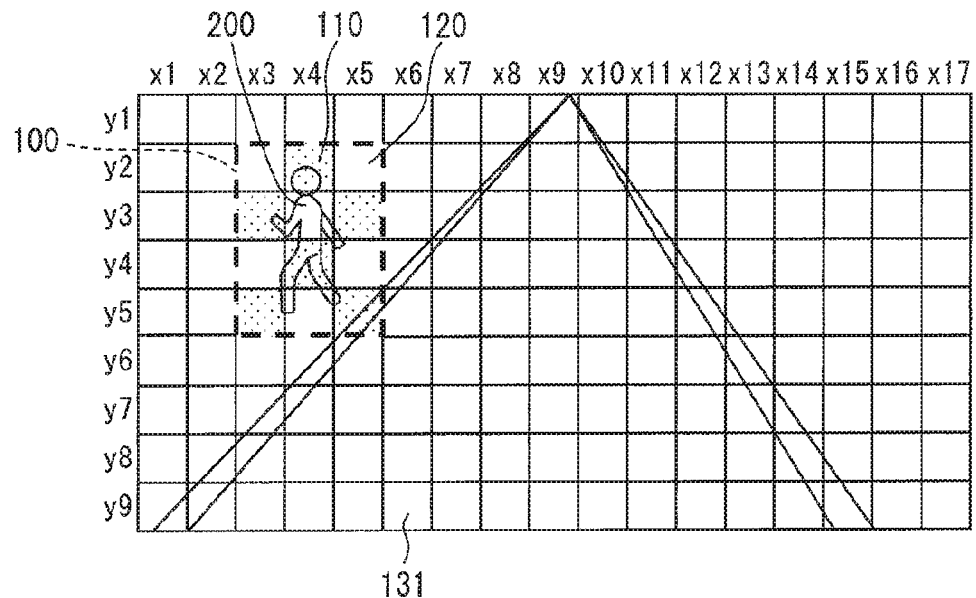
FIG. 3 is a conceptual drawing illustrating an example of the correspondence relation of each mirror of a digital mirror and an illuminated zone according to the embodiment.

In the present embodiment, as illustrated in FIG. 3, the digital mirror 13 provided with 153 mirrors 131 (9 by 17 pieces) is adopted as an example. That is, the digital mirror 13 is provided with 153 mirrors 131 which are arranged from y1 to y9 vertically and from x1 to x17 horizontally. However, the digital mirror 13 may employ mirrors 131 more than 153 pieces, or mirrors 131 less than 153 pieces.

Each of the mirrors 131 is configured to switchover between an ON state and an OFF state in response to a control signal from the headlight controller 11. Each mirror 131 is configured to reflect the light from the light source 12 and to irradiate the reflected light toward the front of the vehicle, when the mirror is set to the ON state. Each mirror 131 is configured not to irradiate the light, which is irradiated from the light source 12, toward the front of the vehicle, when the mirror is set to the OFF state. That is, the headlight controller 11 sets each of the mirrors 131 to the ON state or the OFF state separately, to control the distribution of the light irradiated from the light source 12.

Specifically, each mirror 131 changes an angle thereof depending on the ON state or the OFF state. A mirror 131 in the ON state is set to an angle which reflects the light, which is irradiated from the light source 12, toward the front of the vehicle. A mirror 131 in the OFF state is set to an angle which does not reflect the light, which is irradiated from the light source 12, toward the front of the vehicle. Therefore, the headlight controller 11 performs control of switching between the ON state and the OFF state of each mirror 131, by outputting to the digital mirror 13 a control signal which instructs the angle of each mirror 131.

Regarding the details of the digital mirror 13, refer to a DMD (Digital Micromirror Device) disclosed in Patent Literature 1, for example. The present embodiment adopts an example employing the digital mirror 13 to control the distribution of the light irradiated from the light source 12 by the ON state and the OFF state of the mirror 131 in the digital mirror 13. However, the embodiment is not limited to this example.

The front detector 14 is a device which detects an obstacle existing in front of the vehicle and the position of the obstacle. The front detector 14 can employ a camera and an infrared sensor which are well known, for example. For example, when a camera is employed, the front detector 14 detects the presence or absence of an obstacle and the position of the obstacle, by pattern matching using a picture photographed by the camera and a template, and notifies the detection result to the headlight controller 11. In order to provide an intensified illumination to the obstacle using the light from the light source 12, any of the headlight controller 11 and the front detector 14 can associate the position of the obstacle detected by the front detector 14 with the position of each mirror 131. In other words, any the headlight controller 11 and the front detector 14 can associate the position of the obstacle detected by the front detector 14 with the position in the illumination area of the light from the light source 12. Therefore, the headlight controller 11 is able to grasp what mirror 131 should be switched to the ON state out of the multiple mirrors 131 in order to illuminate the obstacle detected by the front detector 14 with the light emitted from the light source 12.

In the present embodiment, a pedestrian 200 is adopted as an obstacle. However, the obstacle is not limited to a pedestrian. Anything which exists in front of the vehicle with the possibility of disturbing traveling of the vehicle can be adopted as an obstacle. Besides a pedestrian, a parking vehicle and an animal except for man can be adopted, for example.

Here, the processing operation of the headlight controller 11 is explained using FIG. 2 to FIG. 5. The headlight controller 11 starts the processing illustrated in the flow chart of FIG. 2, when the lighting of the light source 12 is instructed. Then, the headlight controller 11 executes the processing repeatedly while the lighting of the light source 12 is instructed, and terminates the processing when the extinction of the light source 12 is instructed. The headlight controller 11 may be instructed for the lighting of the light source 12, by means of a manipulation switch operated by an occupant of the vehicle or by means of a light sensor which detects the quantity of light around the vehicle. Similarly, the headlight controller 11 may be instructed for the extinction of the light source 12, by means of the manipulation switch operated by the occupant of the vehicle or by means of the light sensor which detects the quantity of light around the vehicle. The manipulation switch and the light sensor are not shown in the drawings.

At Step S10, the light source is turned on. The headlight controller 11 outputs a control signal to instruct the lighting of the light source 12. The light source 12 irradiates light responding to this control signal.

At Step S11, the headlight controller 11 (a determination means and a determination unit) determines the presence or absence of an obstacle. The headlight controller 11 determines the presence or absence of a pedestrian 200 serving as an obstacle in front of the vehicle, based on the detection result from the front detector 14. That is, the headlight controller 11 determines whether a pedestrian 200 is present or not, in front of the vehicle. At this time, the headlight controller 11 determines the position of the pedestrian 200 based on the detection result from the front detector 14. Then, when the headlight controller 11 determines that the pedestrian 200 is present, the flow advances to Step S12, and when the headlight controller 11 determines that no pedestrian 200 is present, the flow advances to Step S14. When the headlight controller 11 determines that the pedestrian 200 is present, the headlight controller 11 determines the position of the pedestrian 200.

At Step S12, the headlight controller 11 (a setting means and a setting unit) sets up an intensified illumination area. When the headlight controller 11 determines that the pedestrian 200 is present, the headlight controller 11 sets an area covering the pedestrian 200 as an intensified illumination area 100. In other words, the headlight controller 11 specifies a mirror 131 corresponding to the position of the pedestrian 200 among the multiple mirrors 131, that is, a mirror 131 for illuminating the pedestrian 200 with the light emitted from the light source 12. The intensified illumination area is an area to which the light from the light source 12 is irradiated in a manner different than a peripheral area of the area. Furthermore, the intensified illumination area can be said to be an area to which the light from the light source 12 is irradiated in an intensified manner so that the driver of the vehicle may easily confirm visually the pedestrian 200.

For example, in the example illustrated in FIG. 3, the headlight controller 11 sets up the intensified illumination area 100 to keep the pedestrian 200 in the area. This intensified illumination area 100 corresponds to four mirrors 131 from x3y2 to x3y5, four mirrors 131 from x4y2 to x4y5, and four mirrors 131 from x5y2 to x5y5, in the digital mirror 13.

At Step S13, the headlight controller 11 (a control means and a controller) provides intensified illumination to the intensified illumination area 100 by dividing the intensified illumination area 100 into an illuminated zone 110 and a non-illuminated zone 120. The headlight controller 11 controls the distribution of the light irradiated from the light source 12 so that the intensified illumination area 100 has the illuminated zone 110 and the non-illuminated zone 120.

The headlight controller 11 controls the distribution of the light irradiated from the light source 12 so that a checkered pattern for example may be displayed in the intensified illumination area 100 by the illuminated zone 110 and the non-illuminated zone 120. As for the intensified illumination area 100 in which the checkered pattern is displayed, refer to FIG. 3. Specifically, the headlight controller 11 sets six mirrors 131 of: x3y3, x3y5, x4y2, x4y4, x5y3, and x5y5, to the ON state to form the illuminated zone 110. Furthermore, the headlight controller 11 sets six mirrors 131 of: x3y2, x3y4, x4y3, x4y5, x5y2, and x5y4, to the OFF state to form the non-illuminated zone 120.

A typical headlight never irradiates the light so as to display a checkered pattern at the time of lighting. Therefore, it is possible for the headlight controller 11 to highlight the pedestrian 200 by controlling the light distribution so as to display a checkered pattern in the intensified illumination area 100. The headlight 10 can display a checkered pattern in the intensified illumination area 100 by setting some mirrors 131 of the multiple mirrors 131 to the ON state and the OFF state. Accordingly, it is possible to highlight the pedestrian 200 easily. However, the embodiment is not limited to this example. It may be also preferable to control the distribution of the light irradiated from the light source 12 so as to include the illuminated zone 110 and the non-illuminated zone 120 in the intensified illumination area 100.

When the low beam and the high beam are irradiated and when a pedestrian 200 is present in the area 20, the headlight controller 11 provides an intensified illumination as illustrated in FIG. 5. Even when the low beam is irradiated but the high beam is not irradiated and when a pedestrian 200 is present in the area 20, the headlight controller may provide an intensified illumination as illustrated in FIG. 4. That is, when the light source 12 is lighting and when a pedestrian 200 is present in the available illumination area of the headlight 10, the headlight controller 11 provides the intensified illumination.

At Step S14, an intensified illumination is reset. That is, at Step S14, the headlight controller 11 considers that there is no pedestrian 200 to be confirmed visually by the driver and resets the intensified illumination. When the setup of the intensified illumination area 100 has been made and the intensified illumination has been provided, the headlight controller 11 releases the setup of the intensified illumination area 100 and stops the intensified illumination. When the setup of the intensified illumination area 100 is not made and no intensified illumination is provided, the headlight controller 11 returns to Step S11, without performing the setup of the intensified illumination area 100 and without providing an intensified illumination.

In this way, by setting the area covering the pedestrian 200 as the intensified illumination area 100 to which the light from the light source 12 is irradiated in a manner different than the peripheral area, it is possible for the headlight controller 11 to irradiate the light to the pedestrian 200 so as to be easily confirmed visually by the driver. Furthermore, by controlling the distribution of the light irradiated from the light source 12 so that this intensified illumination area 100 has the illuminated zone 110 and the non-illuminated zone 120, it is possible for the headlight controller 11 to suppress the situation in which no light is momentarily irradiated to the pedestrian 200 as observed in performing the flashing. That is, it is possible for the headlight controller 11 to irradiate the light from the light source 12 so as to highlight the pedestrian 200, and at the same time it is possible to irradiate the light from the light source 12 to some part of the pedestrian 200 at all times. When expressed in another way, the headlight controller 11 controls the distribution of the light irradiated from the light source 12 so as to form concurrently the illuminated zone 110 and the non-illuminated zone 120 in the intensified illumination area 100. Accordingly, it is possible for the headlight controller 11 to suppress a case where the driver becomes difficult to confirm visually the pedestrian 200 due to no light being momentarily irradiated to the pedestrian 200, In order to highlight the pedestrian 200, it is also possible to perform flashing while dimming the irradiating light. However, in this case, it becomes necessary to perform complicated control such as PWM control, in order to provide a gradation display of the luminous intensity. As opposed to this, the headlight controller 11 can irradiate the light to the pedestrian 200 by setting the mirror 131 to the ON state or the OFF state, so as to be easily confirmed visually by the driver. Accordingly, facilitating of the control is expectable compared with the case where flashing is performed by the PWM control. That is, without performing the complicated gradation control, it is possible for the headlight controller 11 to realize the same effect as flashing with the gradation control, simply by the on-off control of the mirror 131.

At Step S13, the headlight controller 11 may repeat the display in the intensified illumination area 100 periodically. At this time, the headlight controller 11 sets the mirror 131 which has been set to the ON state in order to form the illuminated zone 110, to the ON state and the OFF state periodically. Alternatively, the headlight controller 11 may set the mirror 131 which has been set to the OFF state in order to form the non-illuminated zone 120, to the ON state and the OFF state, periodically. That is, the headlight controller 11 may blink the display such as a checkered pattern in the intensified illumination area 100. In this way, it is possible for the headlight controller 11 to highlight the pedestrian 200 much more than when the display in the intensified illumination area 100 is not repeated periodically. However, the embodiment is not limited to this example.

At Step S13, the headlight controller 11 may control the illumination intensity of the illuminated zone 110 so that I the illumination intensity of the illuminated zone 110 is lower than the illumination intensity of an area that is irradiated with light from the light source 12 and that is different from the intensified illumination area 100. When expressed in another way, the headlight controller 11 controls the illuminated zone 110 so that the illuminated zone 110 is darker than the area irradiated with the light from the light source 12 in the circumference of the illuminated zone 110. In the case of FIG. 4 for example, the headlight controller 11 controls the illumination intensity of the illuminated zone 110 so that the illumination intensity of the illuminated zone 110 is lower than the illumination intensity of the low beam area 30. A method of reducing the illumination intensity of the illuminated zone 110 is not limited particularly. For example, the headlight controller 11 switches the mirror 131, which has been set to the ON state in order to form the illuminated zone 110, between the ON state and the OFF state at the speed of the order that the illumination intensity reduces. In this way, the headlight controller 11 is able to suppress the dazzle of the pedestrian 200 and at the same time is able to highlight the pedestrian 200. However, the embodiment is not limited to this example.

The present embodiment employs the headlight 10 which includes the headlight controller 11, the light source 12, the digital mirror 131, and the front detector 14. However, the headlight 10 can achieve the object, without including the front detector 14. That is, if the headlight controller 11 can acquire the detection result of the front detector 14, the headlight 10 can achieve the object, without including the front detector 14.

In the above, the embodiment of the present disclosure has been illustrated. However, the embodiment of the present disclosure is not limited to the embodiment described above at all but it can be variously modified in the range which does not deviate from the spirit and scope of the present disclosure. In the following, first to fifth modifications are explained. The embodiment described above and the first to fifth modifications can be independently implemented respectively and can also be implemented combined together properly. The embodiment of the present disclosure is not limited to the combination shown in the embodiment, but the embodiments obtained with various combinations are also included in the embodiment of the present disclosure.

(First Modification)

Figure 6A:
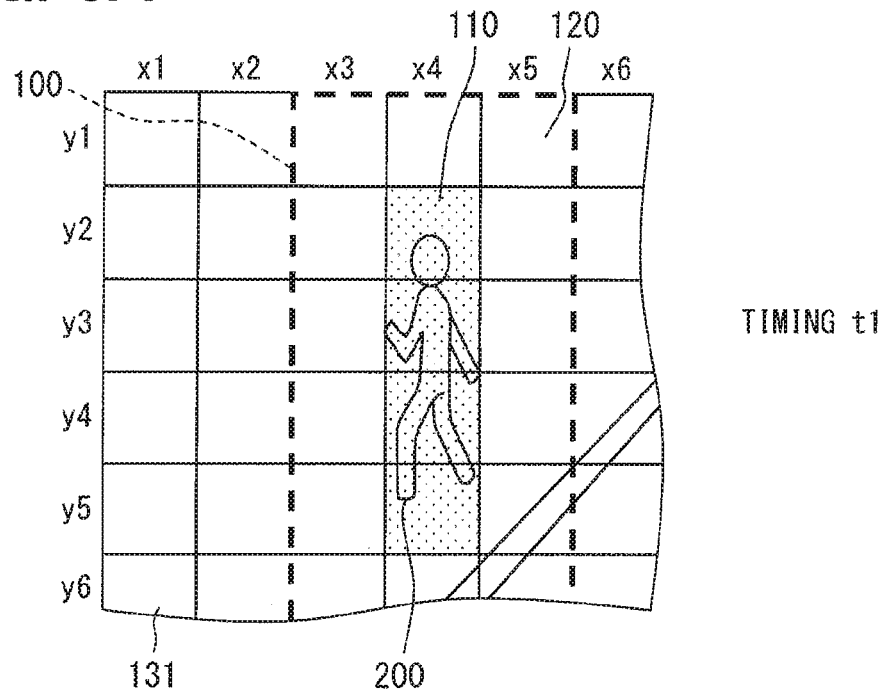
FIG. 6A is a conceptual drawing illustrating a correspondence relation of each mirror element of the digital mirror at timing t1 and the intensified illumination area according to a first modification.
Figure 6B:
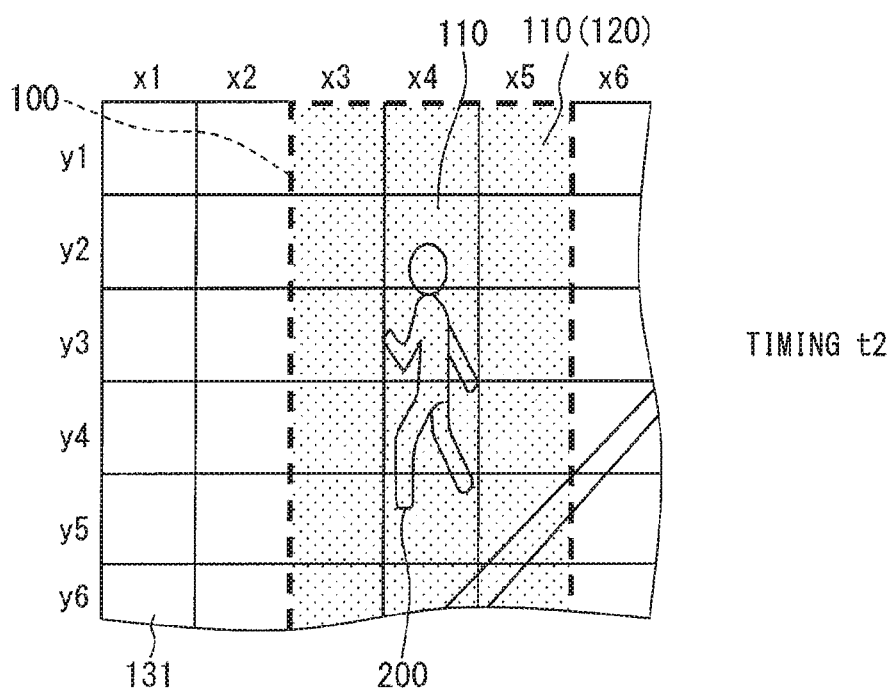
FIG. 6B is a conceptual drawing illustrating a correspondence relation of each mirror element of the digital mirror at timing t2 and the intensified illumination area according to the first modification.

Next, a first modification is explained using FIG. 6A and FIG. 6B. In the first modification, the explanation is made using the same symbol as the above-described embodiment for the sake of convenience.

The headlight controller 11 (a control means and a controller) may control the distribution of the light irradiated from the light source 12 so as to make brighter and darker the outline of the pedestrian 200 periodically in the intensified illumination area 100. That is, the headlight controller 11 may control the distribution of the light irradiated from the light source 12 so as to blink the outline of the pedestrian 200 in the intensified illumination area 100.

Here, the case where the headlight controller 11 sets up the intensified illumination area 100 as shown in FIG. 6A and FIG. 6B is employed as an example. This intensified illumination area 100 corresponds to six mirrors 131 from x3y1 to x3y6, six mirrors 131 from x4y1 to x4y6, and six mirrors 131 from x5y1 to x5y6 in the digital mirror 13. The headlight controller 11 switches some mirrors 131 among these mirrors 131 between the ON state and the OFF state, according to the passage of time.

Specifically, at timing t1, the headlight controller 11 sets four mirrors 131 of: x4y2 to x4y5, to the ON state to form the illuminated zone 110. At timing t1, the headlight controller 11 sets the 14 mirrors 131 of: x3y1 to x3y6, x4y1, x4y6, and x5y1 to x5y6, to the OFF state to form the non-illuminated zone 120.

Subsequently, when timing t1 changes to timing t2, the headlight controller 11 continue to set the four mirrors 131 of: x4y2 to x4y5, to the ON state to form the illuminated zone 110. When timing t1 changes to timing t2, the headlight controller 11 switches the 14 mirrors 131 of: x3y1 to x3y6, x4y1, x4y6, and x5y1 to x5y6, from the OFF state to the ON state. Accordingly, the headlight controller 11 irradiates the light from the light source 12 to the area which has been the non-illuminated zone 120 at timing t1. That is, at timing t2, the headlight controller 11 forms the illuminated zone 110 by setting the 14 mirrors 131 of: x3y1 to x3y6, x4y1, x4y6, and x5y1 to x5y6, to the ON state.

The headlight controller 11 controls the distribution of the light irradiated from the light source 12 so as to blink the outline of the pedestrian 200, by repeatedly executing the control at timing t1 and the control at timing t2. In this way, it can be said that the headlight controller 11 switches the outline of the pedestrian 200 between the illuminated zone 110 and the non-illuminated zone 120. Also in the first modification, it is possible to produce the similar effect as in the embodiment described above. Furthermore, it is possible for the headlight controller 11 to further highlight the pedestrian 200 by blinking the outline of the pedestrian 200.

(Second Modification)

Figure 7:
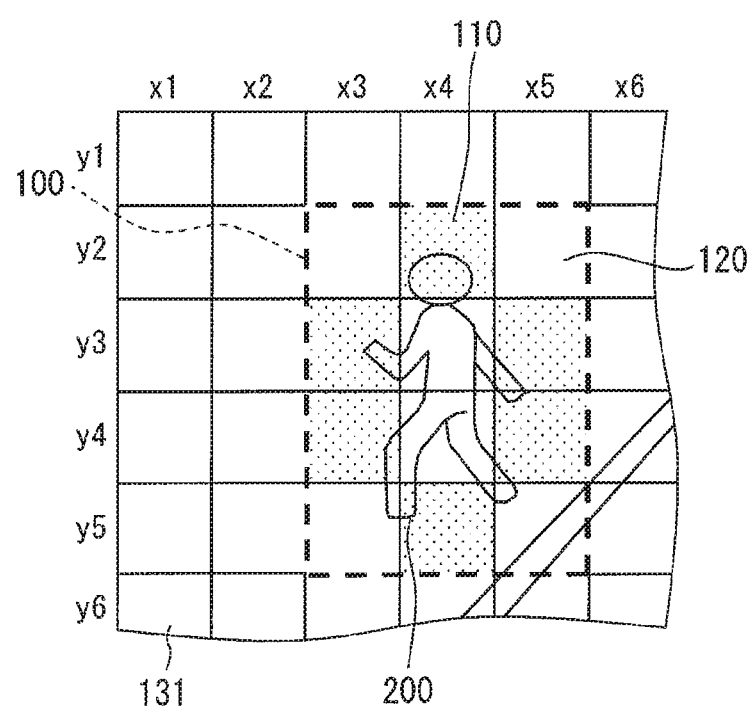
FIG. 7 is a conceptual drawing illustrating an example of a correspondence relation of each mirror element of the digital mirror and an intensified illumination area according to a second modification.

Next, a second modification is explained using FIG. 7. In the second modification, the explanation is made using the same symbol as the above-described embodiment for the sake of convenience.

As illustrated in FIG. 7, the headlight controller 11 may control the distribution of the light irradiated from the light source 12 so that a geometrical pattern may be displayed in the intensified illumination area 100 with the use of the illuminated zone 110 and the non-illuminated zone 120. Here, as illustrated in FIG. 7, the case where the headlight controller 11 sets up the same zone as in the above-described embodiment as the intensified illumination area 100 is employed as an example.

Then, the headlight controller 11 sets six mirrors 131 of: x3y3, x3y4, x4y2, x4y5, x5y3, and x5y4, to the ON state to form the illuminated zone 110. The headlight controller 11 sets six mirrors 131 of: x3y2, x3y5, x4y3, x4y4, x5y2, and x5y5, to the OFF state to form the non-illuminated zone 120. Also in the first modification, it is possible to produce the similar effect as in the embodiment described above.

As is the case with the embodiment described above, the headlight controller 11 may repeat the display in the intensified illumination area 100 periodically. Even by the present method, it is possible to produce the similar effect as in the embodiment described above.

(Third Modification)

Figure 8A:
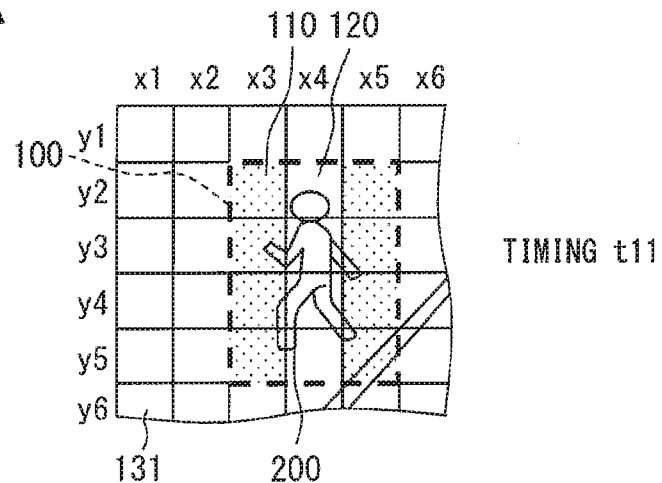
FIG. 8A is a conceptual drawing illustrating an example of a correspondence relation of each mirror element of the digital mirror at timing t11 and the intensified illumination area according to a third modification.
Figure 8B:
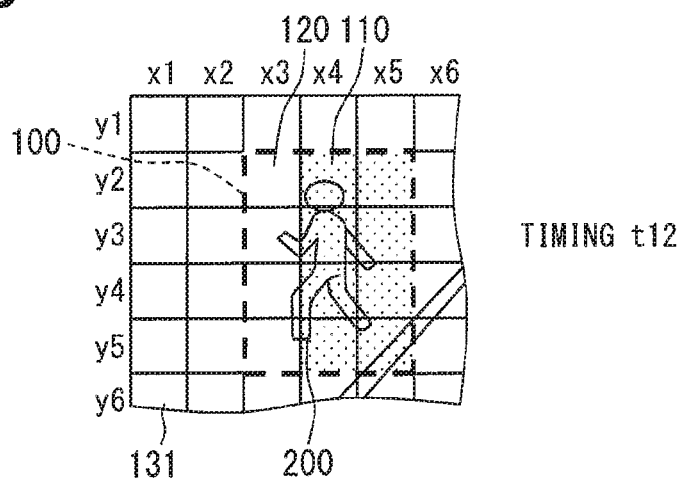
FIG. 8B is a conceptual drawing illustrating an example of a correspondence relation of each mirror element of the digital mirror at timing t12 and the intensified illumination area according to the third modification.
Figure 8C:
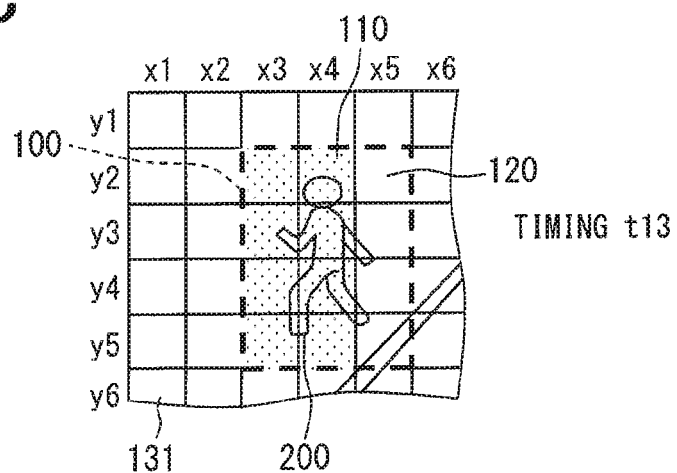
FIG. 8C is a conceptual drawing illustrating an example of a correspondence relation of each mirror element of the digital mirror at timing t13 and the intensified illumination area according to the third modification.

Next, a third modification is explained using FIG. 8A, FIG. 8B, and FIG. 8C. In the third modification, the explanation is made using the same symbol as the above-described embodiment for the sake of convenience, The headlight controller 11 may move the display in the intensified illumination area 100. That is, the headlight controller 11 controls the distribution of the light irradiated from the light source 12 so that the illuminated zone 110 and the non-illuminated zone 120 may move in the intensified illumination area 100. Here, as illustrated in FIG. 8A, FIG. 8B, and FIG. 8C, the case where the headlight controller 11 sets up the same zone as in the above-described embodiment as the intensified illumination area 100 is employed as an example.

Then, at timing t11, the headlight controller 11 sets eight mirrors 131 of: x3y2 to x3y5 and x5y2 to x5y5, to the ON state to form the illuminated zone 110. At timing t11, the headlight controller 11 sets four mirrors 131 of: x4y2 to x4y5, to the OFF state to form the non-illuminated zone 120.

Subsequently, when timing t11 changes to timing t12, the headlight controller 11 sets eight mirrors 131 of: x4y2 to x4y5 and x5y2 to x5y5, to the ON state to form the illuminated zone 110. When timing t11 changes to timing t12, the headlight controller 11 sets four mirrors 131 of: x3y2 to x3y5, to the OFF state to form the non-illuminated zone 120, Further subsequently, when timing t12 changes to timing t13, the headlight controller 11 sets eight mirrors 131 of: x3y2 to x3y5 and x4y2 to x4y5, to the ON state to form the illuminated zone 110. When timing t12 changes to timing t13, the headlight controller 11 sets four mirrors 131 of: x5y2 to x5y5, to the OFF state to form the non-illuminated zone 120.

The headlight controller 11 controls the distribution of the light irradiated from the light source 12 by repeatedly executing the control at timing t11, the control at timing t12, and the control at timing t13 in rotation, so that the illuminated zone 110 and the non-illuminated zone 120 may move. Also in the third modification, it is possible to produce the similar effect as in the embodiment described above. Furthermore, it is possible for the headlight controller 11 to further highlight the pedestrian 200, by moving the illuminated zone 110 and the non-illuminated zone 120. A movement mode of the illuminated zone 110 and the non-illuminated zone 120 is not limited to this example.

(Fourth Modification)

Figure 9:
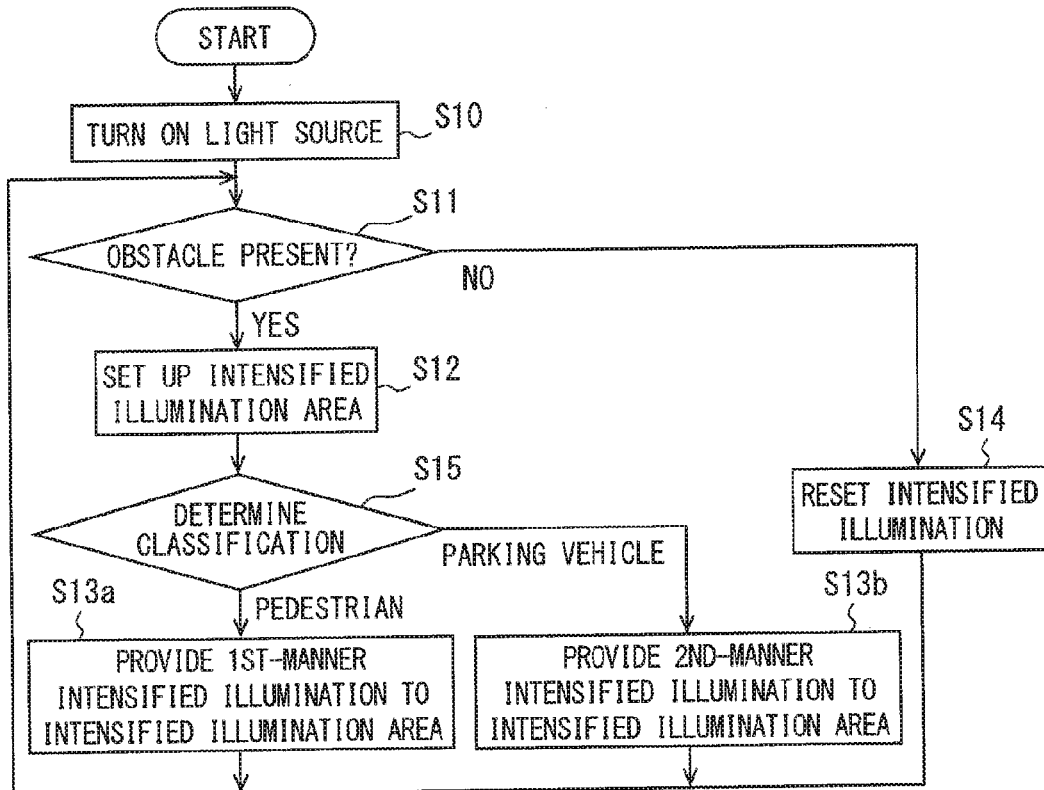
FIG. 9 is a flow chart illustrating a processing operation of a headlight control device in a fourth modification.
Figure 10:
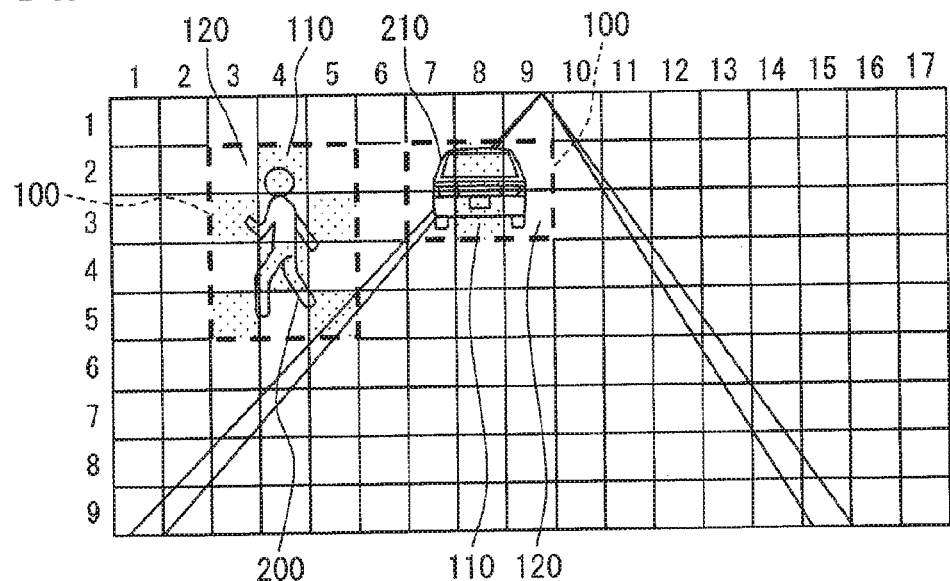
FIG. 10 is a conceptual drawing illustrating an example of a correspondence relation of each mirror element of the digital mirror and an intensified illumination area according to the fourth modification.

Next, a fourth modification is explained using FIG. 9 and FIG. 10. In the fourth modification, the explanation is made using the same symbol as the above-described embodiment for the sake of convenience. Regarding the flow chart of FIG. 9, the same step number is given to the same processing as in FIG. 2, and the explanation thereof is omitted.

For every classification of an obstacle, the headlight controller 11 may change the distribution of the light irradiated from the light source 12 to the intensified illumination area 100. In this case, the headlight controller 11 (a specifying means and a specifying unit) specifies the classification of the obstacle, when the presence of the obstacle is determined at Step S11. At this time, the headlight controller 11 specifies the classification of the obstacle based on the detection result from the front detector 14. The front detector 14 determines the classification of the obstacle by pattern matching using the photographed picture and a template. Then, the front detector 14 notifies the headlight controller 11 of the determination result. The headlight controller 11 may specify the classification of the obstacle by pattern matching using the template and the picture photographed with a camera serving as the front detector 14. Here, a pedestrian 200 and a parking vehicle 210 are employed as an example of an obstacle. However, the obstacle is not limited to the pedestrian 200 and the parking vehicle 210.

Here, a processing operation of the headlight controller 11 according to the fourth modification is explained using FIG. 9. After finishing the processing at Step S12, the headlight controller 11 makes determination at Step S15. At Step S15, the headlight controller 11 (a specifying means and a specifying unit) specifies the classification of the obstacle. Then, when it is determined that the obstacle is a pedestrian 200, the headlight controller 11 advances to Step S13a, and when it is determined that the obstacle is a parking vehicle 210, the headlight controller 11 advances to Step S13b. As illustrated in FIG. 10, when both of the pedestrian 200 and the parking vehicles 210 exist as the obstacle, the headlight controller 11 performs Step S13*a* and Step S13*b* in parallel.

At Step S13*a*, the headlight controller 11 (a controller and a control means) provides the intensified illumination to the intensified illumination area in a first manner corresponding to the pedestrian 200. At Step S13*b*, the headlight controller 11 provides the intensified illumination to the intensified illumination area in a second manner corresponding to the parking vehicle 210.

The pedestrian 200 as the specified result and the first manner, and the second manner as the specified result are associated in advance, and are stored in the storage unit of the headlight controller 11 for example. That is, when the headlight controller 11 specifies the classification of the obstacle at Step S15, the headlight controller 11 can grasp in which manner the intensified illumination is to be provided, by referring to the storage unit for example. In other words, when the headlight controller 11 specifies the classification of the obstacle, the headlight controller 11 can grasp how to set each of the multiple mirrors 131 to the ON state and the OFF state, by referring to the storage unit for example.

In FIG. 10, the case where the headlight controller 11 sets up the intensified illumination area 100 to the pedestrian 200 and the intensified illumination area 100 to the parking vehicle 210 is employed as an example. The headlight controller 11 controls the light distribution so as to display a checkered pattern in the intensified illumination area 100 to the pedestrian 200, and the headlight controller 11 controls the light distribution so as to display a vertical bar pattern in the intensified illumination area 100 to the parking vehicle 210. The intensified illumination area 100 to the pedestrian 200 corresponds to the mirror 131 same as in the embodiment described above. On the other hand, the intensified illumination area 100 to the parking vehicle 210 corresponds to six mirrors 131 of: x7y2, x7y3, x8y2, x8y3, x9y2, and x9y3, in the digital mirror 13.

Specifically, the headlight controller 11 sets six mirrors 131 of: x3y3, x3y5, x4y2, x4y4, x5y3, and x5y5, to the ON state to form the illuminated zone 110 in the intensified illumination area 100 covering the pedestrian 200. The headlight controller 11 sets six mirrors 131 of: x3y2, x3y4, x4y3, x4y5, x5y2, and x5y4, to the OFF state to form the non-illuminated zone 120 in the intensified illumination area 100 covering the pedestrian 200.

Furthermore, the headlight controller 11 sets two mirrors 131 of: x8y2 and x8y3, to the ON state to form the illuminated zone 110 in the intensified illumination area 100 covering the parking vehicle 210. The headlight controller 11 sets four mirrors 131 of: x7y2, x7y3, x9y2, and x9y3, to the OFF state to form the non-illuminated zone 120 in the intensified illumination area 100 covering the parking vehicle 210.

Also in the fourth modification, it is possible to produce the similar effect as in the embodiment described above. Furthermore, it is possible for the headlight controller 11 to notify the driver of the classification of the obstacle. The modification is not limited to what is described above. The obstacle may be classified into three or more kinds of classification. The manner of the intensified illumination corresponding to each classification can also employ the manner explained in the first to third modifications. For example, the headlight controller 11 may control the light distribution so as to display what is explained in the first modification in the intensified illumination area 100 to the pedestrian 200, and may control the light distribution so as to display a checkered pattern in the intensified illumination area 100 to the parking vehicle 210.

(Fifth Modification)

Figure 11:
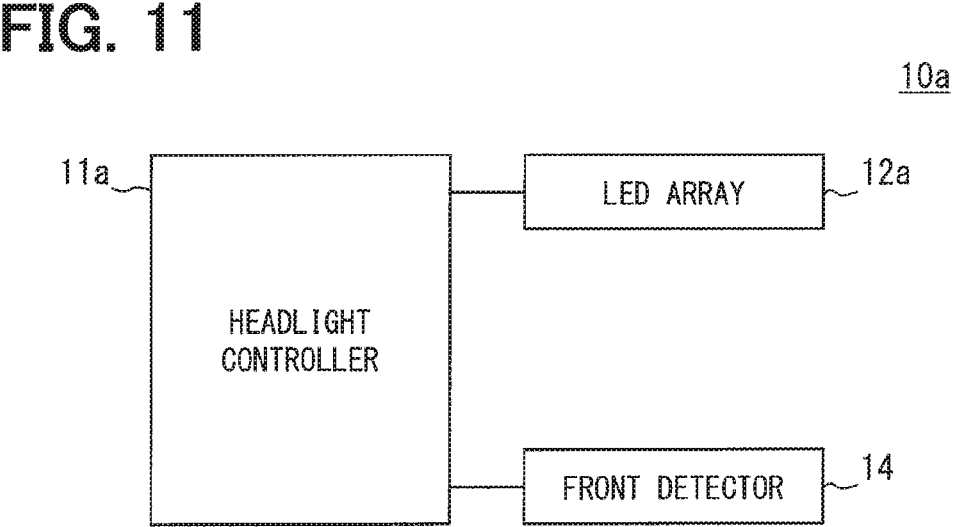
FIG. 11 is a block diagram illustrating an outline configuration of a headlight according to a fifth modification.

Next, a fifth modification is explained using FIG. 11. The front detector in the fifth modification is the same as in the embodiment described above, and accordingly the same symbol is used.

A headlight 10*a* includes a headlight controller 11*a*, an LED array 12*a*, and a front detector 14. That is, the headlight 10*a* includes the LED array 12*a* instead of the light source 12 and the digital mirror 13.

The LED array 12*a* is based on the well-known technology, and it includes multiple LEDs as a light source. The LED is a light emitting element. The light emitting element can employ a laser diode, etc.

The headlight controller 11*a* (a control means and a controller) controls the distribution of the light irradiated from the LED, by turning on and off each of the LEDs individually. That is, the headlight controller 11*a* turns on and off each of the LEDs individually to control the light distribution in the same manner as in the headlight controller 11.

Also in the fifth modification, it is possible to produce the similar effect as in the embodiment described above. Furthermore, the headlight controller 11*a* turns on and off each of the LEDs individually. Accordingly, it is possible to adjust the illumination intensity more easily than by the headlight controller 11. For example, the headlight controller 11*a* can perform control more easily than the headlight controller 11, in controlling the illuminated zone 110 so that the illuminated zone 110 is darker than the region irradiated with the light from the LED array 12*a* in the surroundings of the illuminated zone 110.

The embodiment described above and the first to fifth modifications adopt examples in which the distribution of the light irradiated from the light source is controlled by the digital mirror 13 or the LED array 12*a*. However, the embodiment and the modifications of the present disclosure are not limited to these examples. As long as the distribution of the light irradiated from the light source can be controlled, other device than the digital mirror 13 or the LED array 12*a* may be employed.

The invention claimed is:

1. A headlight control device provided in a vehicle to perform headlight control and to control a distribution of light irradiated from a light source, the headlight control device comprising:
    a controller, the controller is configured to
        determine, in a determination unit, a presence and an absence of an obstacle in front of the vehicle and determine a position of the obstacle;
        set up, in a setting unit, an area covering the obstacle as an intensified illumination area when the determination unit determines the presence of the obstacle, wherein the intensified illumination area is smaller than each of a high beam area and a low beam area and is an area to which the light from the light source is irradiated in a manner different than a peripheral area of the intensified illumination area; and
        control, by the controller, the distribution of the light irradiated from the light source so that the intensified illumination area, which is smaller than each of the high beam area and the low beam area and is set up by the setting unit, has an illuminated zone and a non-illuminated zone.

2. The headlight control device according to claim 1, wherein the controller is further configured to control the distribution of the light irradiated from the light source so that, by the illuminated zone and the non-illuminated zone, a checkered pattern is displayed in the intensified illumination area.

3. The headlight control device according to claim 2, wherein
the controller is further configured to repeat the display in the intensified illumination area periodically.

4. The headlight control device according to claim 1, wherein
the controller is further configured to control the distribution of the light irradiated from the light source so that, by the illuminated zone and the non-illuminated zone, a geometrical pattern is displayed in the intensified illumination area.

5. The headlight control device according to claim 1, wherein
the controller is further configured to control the distribution of the light irradiated from the light source so that the outline of the obstacle in the intensified illumination area is periodically blinked.

6. The headlight control device according to claim 1, wherein
the controller is further configured to control the distribution of the light irradiated from the light source so that the illuminated zone and the non-illuminated zone move in the intensified illumination area.

7. The headlight control device according to claim 1, wherein the controller is further configured to:
specify, in a specifying unit, a classification of the obstacle of which the presence is determined by the determination unit,
wherein
for every classification specified by the specifying unit, the controller is configured to control the distribution of the light irradiated from the light source in the intensified illumination area.

8. The headlight control device according to claim 1, wherein
the controller is further configured to control an illumination intensity of the illuminated zone so that the illumination intensity of the illuminated zone is lower than an illumination intensity of another area (i) that is irradiated from the light source and (ii) that is different from the intensified illumination area.

9. The headlight control device according to claim 1, wherein
the headlight comprises a plurality of mirrors to reflect the light irradiated from the light source and to irradiate the reflected light toward the front of the vehicle,
each mirror in an ON state reflects the light irradiated from the light source and irradiates the reflected light to the front of the vehicle, and each mirror in an OFF state does not irradiate the light, which is irradiated from the light source, toward the front of the vehicle, and
the controller is further configured to control the distribution of the light irradiated from the light source, by individually setting each mirror to the ON state and the OFF state.

10. The headlight control device according to claim 1, wherein
the light source of the headlight comprises a plurality of light emitting elements, and
the controller is further configured to control the distribution of the light irradiated from the light source, by individually turning each light emitting element on and off.

11. A headlight comprising:
the headlight control device according to claim 1;
the light source; and
a plurality of the mirrors.

12. A headlight comprising:
the headlight control device according to claim 1; and
the light source.

13. The headlight control device according to claim 1, wherein the intensified illumination area is part of the high beam area.

14. A headlight control device provided in a vehicle to perform headlight control and to control a distribution of light irradiated from a light source, the headlight control device comprising:
a controller, the controller is configured to
determine, in a determination unit, a presence and an absence of an obstacle in front of the vehicle and determine a position of the obstacle;
set up, in a setting unit, an area covering the obstacle as an intensified illumination area when the determination unit determines the presence of the obstacle, wherein the intensified illumination area is an area to which the light from the light source is irradiated in a manner different than a peripheral area of the intensified illumination area;
control, by the controller, the distribution of the light irradiated from the light source so that the intensified illumination area set up by the setting unit, has an illuminated zone and a non-illuminated zone; and
specify, in a specifying unit, a classification of the obstacle of which the presence is determined by the determination unit,
wherein
for every classification specified by the specifying unit, the controller is configured to control the distribution of the light irradiated from the light source in the intensified illumination area.

15. A headlight control device provided in a vehicle to perform headlight control and to control a distribution of light irradiated from a light source, the headlight control device comprising:
a controller, the controller is configured to
determine, in a determination unit, a presence and an absence of an obstacle in front of the vehicle and determine a position of the obstacle;
set up, in a setting unit, an area covering the obstacle as an intensified illumination area when the determination unit determines the presence of the obstacle, wherein the intensified illumination area is an area to which the light from the light source is irradiated in a manner different than a peripheral area of the intensified illumination area; and
control, by the controller, the distribution of the light irradiated from the light source so that the intensified illumination area set up by the setting unit, has an illuminated zone and a non-illuminated zone,
wherein
the headlight comprises a plurality of mirrors to reflect the light irradiated from the light source and to irradiate the reflected light toward the front of the vehicle,
each mirror in an ON state reflects the light irradiated from the light source and irradiates the reflected light to the front of the vehicle, and each mirror in an OFF state does not irradiate the light, which is irradiated from the
light source, toward the front of the vehicle, and the controller is further configured to control the distribution of the light irradiated from the light source, by individually setting each mirror to the ON state and the OFF state.

* * * * *